US011915894B2

(12) United States Patent
Yoo

(10) Patent No.: US 11,915,894 B2
(45) Date of Patent: Feb. 27, 2024

(54) DIRECT CURRENT RELAY

(71) Applicant: LS ELECTRIC CO., LTD., Anyang-si (KR)

(72) Inventor: Jungwoo Yoo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 521 days.

(21) Appl. No.: 17/268,658

(22) PCT Filed: Aug. 13, 2019

(86) PCT No.: PCT/KR2019/010278
§ 371 (c)(1),
(2) Date: Feb. 16, 2021

(87) PCT Pub. No.: WO2020/045860
PCT Pub. Date: Mar. 5, 2020

(65) Prior Publication Data

US 2021/0175031 A1 Jun. 10, 2021

(30) Foreign Application Priority Data

Aug. 31, 2018 (KR) ........................ 10-2018-0103724

(51) Int. Cl.
*H01H 33/59* (2006.01)
*H01H 1/54* (2006.01)
(Continued)

(52) U.S. Cl.
CPC ............ *H01H 33/596* (2013.01); *H01H 1/54* (2013.01); *H01H 50/36* (2013.01); *H01H 50/60* (2013.01); *H01H 2235/01* (2013.01)

(58) Field of Classification Search
CPC ........ H01H 33/596; H01H 1/54; H01H 50/36; H01H 50/60; H01H 2235/01; H01H 50/20;
(Continued)

(56) References Cited

U.S. PATENT DOCUMENTS

2009/0322454 A1 12/2009 Tanaka
2013/0115807 A1* 5/2013 Enomoto .............. H01H 50/38 439/539
(Continued)

FOREIGN PATENT DOCUMENTS

CN 209729832 U 12/2019
JP 2003-016902 A 1/2003
(Continued)

OTHER PUBLICATIONS

Japanese Office Action for related Japanese Application No. 2021-508299; action dated Jan. 4, 2022; (8 pages).
(Continued)

*Primary Examiner* — Dharti H Patel
(74) *Attorney, Agent, or Firm* — K&L Gates LLP

(57) ABSTRACT

The present disclosure relates to a direct current relay having a mover assembly having improved contact pressure. In one embodiment, a direct current relay comprises a pair of fixed contactors and a movable contactor which is moved up and down by an actuator to come into contact with or be separated from the pair of fixed contactors, comprises: a mover support disposed below the movable contactor and connected to the actuator by a shaft; a mover holder disposed above the movable contactor and fixed to the mover support; an upper yoke and a lower yoke disposed above and below the movable contactor to generate an electromagnetic force, respectively; and a contact pressure spring disposed between the lower yoke and the mover support, wherein the upper
(Continued)

yoke and the lower yoke form a magnetic path to offset an electron repulsive force generated between the fixed contactors and the movable contactor.

14 Claims, 6 Drawing Sheets

(51) Int. Cl.
*H01H 50/36* (2006.01)
*H01H 50/60* (2006.01)

(58) Field of Classification Search
CPC ...... H01H 1/50; H01H 51/065; H01H 50/546; H01H 1/2008; H01H 2231/026
USPC .............................................................. 361/2
See application file for complete search history.

(56) References Cited

U.S. PATENT DOCUMENTS

| | | | |
|---|---|---|---|
| 2015/0077202 | A1 | 3/2015 | Enomoto |
| 2015/0187518 | A1 | 7/2015 | Molyneux |

FOREIGN PATENT DOCUMENTS

| | | | |
|---|---|---|---|
| JP | 2012022984 | A | 2/2012 |
| JP | 2014132595 | A | 7/2014 |
| JP | 2014232669 | A | 12/2014 |
| JP | 2018-133347 | A | 8/2018 |
| KR | 10-1034371 | B1 | 5/2011 |
| KR | 10-2039323 | B1 | 11/2019 |
| WO | 2014083769 | A1 | 6/2014 |

OTHER PUBLICATIONS

International Search Report dated Nov. 21, 2019—mailed in corresponding PCT Application No. PCT/KR2019/010278.
Korean Office Action dated Jan. 23, 2020—mailed in corresponding Korean Application No. 10-2018-0103724.
Decision of Rejection dated May 18, 2020—mailed in corresponding Korean Application No. 10-2018-0103724—4 Pages.
Decision of Rejection dated Jul. 1, 2020—mailed in corresponding Korean Application No. 10-2018-0103724—3 Pages.
Request for prioritized examination filed on Dec. 13, 2019—filed in corresponding Korean Application No. 10-2018-0103724.
Extended European Search Report for related European Application No. 19855431.3; action dated May 6, 2022; (7 pages).

* cited by examiner

DIRECT CURRENT RELAY

CROSS-REFERENCE TO RELATED APPLICATIONS

This application is the National Stage filing under 35 U.S.C. 371 of International Application No. PCT/KR2019/010278, filed on Aug. 13, 2019, which claims the benefit of earlier filing date and right of priority to Korean Application No. 10-2018-0103724 filed on Aug. 31, 2018, the contents of which are all hereby incorporated by reference herein in their entirety.

TECHNICAL FIELD

The present disclosure relates to a direct current relay and, more particularly, to a direct current relay including a mover assembly having improved contact pressure.

BACKGROUND

In general, a direct current relay or a magnetic switch is a kind of electrical circuit switching device that allows mechanical operation and transmits current signal using principles of electromagnet, and is installed in various industrial facilities, machines, and vehicles.

In particular, electric vehicles such as hybrid vehicles, fuel cell vehicles, golf carts, and electric forklifts are equipped with an electric vehicle relay to supply and cut off power of a battery to a power generating device and an electrical equipment. And, such an electric vehicle relay is one of very important core components in electric vehicles.

FIG. 1 illustrates an internal structure of a direct current relay according to the related art.

The direct current relay includes a case 1, 2 including an upper frame 1 and a lower frame 2, a middle plate 9 provided inside the case, a contact portion 3, 4 and an arc-extinguishing portion 8 both installed above the middle plate 9, and an actuator 7 installed under the middle plate 9. Here, the actuator 7 may be a device that operates by the principles of electromagnet.

At an upper surface of the upper frame 1, a fixed contact 3 of the contact portion 3, 4 is exposed so as to be connected to a load or power source.

The contact portion 3, 4 and the arc-extinguishing portion 8 are provided inside the upper frame 1. The contact portion 3, 4 includes the fixed contact 3 fixedly installed in the upper frame 1, and a movable contact 4 actuated by the actuator 7 so as to be brought into contact with or separated from the fixed contact 3. The arc-extinguishing portion 8 is usually made of a ceramic material. The arc-extinguishing portion 8 is also referred to as an arc chamber. Inside the arc-extinguishing portion 8, there may be filled with extinguishing gas for arc extinguishing.

To effectively control an arc generated when the contact portion 3, 4 is cutoff (or separated), a permanent magnet (not illustrated) may be provided. The permanent magnet is installed around the contact portion to generate a magnetic field to control the arc, which is a rapid flow of electricity, and a permanent magnet holder 6 is provided to fix the permanent magnet.

The actuator is operated using the principles of electromagnet and includes a fixed core 7*a*, a movable core 7*b*, a movable shaft 7*c*, and a return spring 7*d*. A cylinder 7*e* surrounds the fixed core 7*a* and the movable core 7*b*. The cylinder 7*e* and the arc-extinguishing portion 8 form a closed space.

A coil 7*f* is provided around the cylinder 7*e*, and when a control power is applied, an electromagnetic force is generated around the cylinder 7*e*. The fixed core 7*a* is magnetized by the electromagnetic force generated by the coil 7*f*, and the movable core 7*b* is attracted by a magnetic force of the fixed core 7*a*. Accordingly, the movable shaft 7*c* coupled to the movable core 7*b* and the movable contact 4 coupled to an upper portion of the movable shaft 7*c* move together to be brought into contact with the fixed contact 3 so that the circuit is energized. The return spring 7*d* provides an elastic force to the movable core 7*b* to allow the movable core 7*b* to return to its initial position when the control power of the coil is cut off.

However, in the direct current relay according to the related art, an electromagnetic repulsive force is generated between the fixed contact and the movable contact, and thus the fixed contact and the movable contact tend to be separated from each other. In order to prevent unintentional separation due to such an electromagnetic repulsive force, the movable contact 4 receives a contact pressure from a contact pressure spring 5. In other words, a distance between the fixed core 7*a* and the movable core 7*b* is set longer than a distance between the fixed contact 3 and the movable contact 4, so that the movable contact receives a contact pressure due to an over travel of the movable core. However, when the electromagnetic repulsive force is stronger than the contact pressure, there is still a risk of separation of the contact portion.

SUMMARY

The present disclosure is to solve those problems, and an aspect of the present disclosure is to provide a magnetic contactor provided with a mover assembly that improves a contact pressure.

A direct current relay according to an aspect of the present disclosure including a pair of fixed contacts and a movable contact moved vertically by an actuator to be brought into contact with or be separated from the pair of fixed contacts, includes a mover support disposed below the movable contact and connected to the actuator by a shaft, a mover holder disposed above the movable contact and fixed to the mover support, an upper yoke and a lower yoke respectively disposed above and below the movable contact to generate an electromagnetic force, and a contact pressure spring disposed between the lower yoke and the mover support, wherein the upper yoke and the lower yoke form a magnetic circuit to offset an electromagnetic repulsive force generated between the fixed contacts and the movable contact.

Here, an upper end of the shaft is provided with a coupling portion inserted into the mover support.

In addition, the mover support includes a first flat plate portion, and arm portions protruding upwardly from opposite side ends of the first flat plate portion to which the mover holder is fixed.

In addition, an upper portion of the first flat plate portion is provided with a spring support portion protruding therefrom to support a lower end of the contact pressure spring.

In addition, the mover holder includes a second flat plate portion, and side surface portions bent downwardly at opposite side ends of the second flat plate portion.

In addition, a lower surface of the second flat plate portion is provided with a support portion protruding therefrom, and the support portion is inserted in a support groove formed at an upper surface of the movable contact.

In addition, a length (or a depth) of each of the support portion and the support groove is greater than an over travel length of the movable contact.

In addition, the side surface portions include first side surface portions extending downwardly from opposite ends of the second flat plate portion, and second side surface portions each extending downwardly from the first side surface portion, wherein a width of the second side surface portion is greater than a width of the first side surface portion.

In addition, a thickness of the mover holder is smaller than a thickness of the mover support.

In addition, a lower surface of the lower yoke is provided with an insertion groove into which an upper end portion of the contact pressure spring is inserted.

In addition, the upper yoke includes a third flat plate portion, and wing portions extending downwardly from opposite ends of the third flat plate portion so as to be fitted into the mover holder.

In addition, a lower surface of the movable contact is provided with a yoke insertion groove into which the lower yoke is partially inserted.

In addition, the upper yoke is disposed on an upper portion or a lower portion of the mover holder.

A direct current relay according to another aspect of the present disclosure includes a pair of fixed contacts, and a mover assembly moved vertically by an actuator to be brought into contact with or separated from the pair of fixed contacts so as to energize or cut off a circuit, wherein the mover assembly includes a mover support connected to the actuator by a shaft, a mover holder fixed to an upper portion of the mover support, a movable contact installed between the mover holder and the mover support, and an upper yoke and a lower yoke respectively provided on an upper portion and a lower portion of the movable contact to generate an electromagnetic force, and wherein the mover assembly is arranged such that the upper yoke, the mover holder, the movable contact, the lower yoke, and the mover support are sequentially arranged from top to bottom, or the mover holder, the upper yoke, the movable contact, the lower yoke, and the mover support are sequentially arranged from top to bottom.

According to a direct current relay according to an embodiment of the present disclosure, since a movable contact is provided with an upper yoke and a lower yoke to offset an electromagnetic repulsive force, a contact portion is not unintendedly separated.

DETAILED DESCRIPTION

Hereinafter, preferred embodiments of the present disclosure will be described with reference to the accompanying drawings, but this is to explain in detail enough for those skilled in the art to easily implement the disclosure, and it does not mean that the technical idea and scope of the disclosure are limited thereto.

Figure 1:
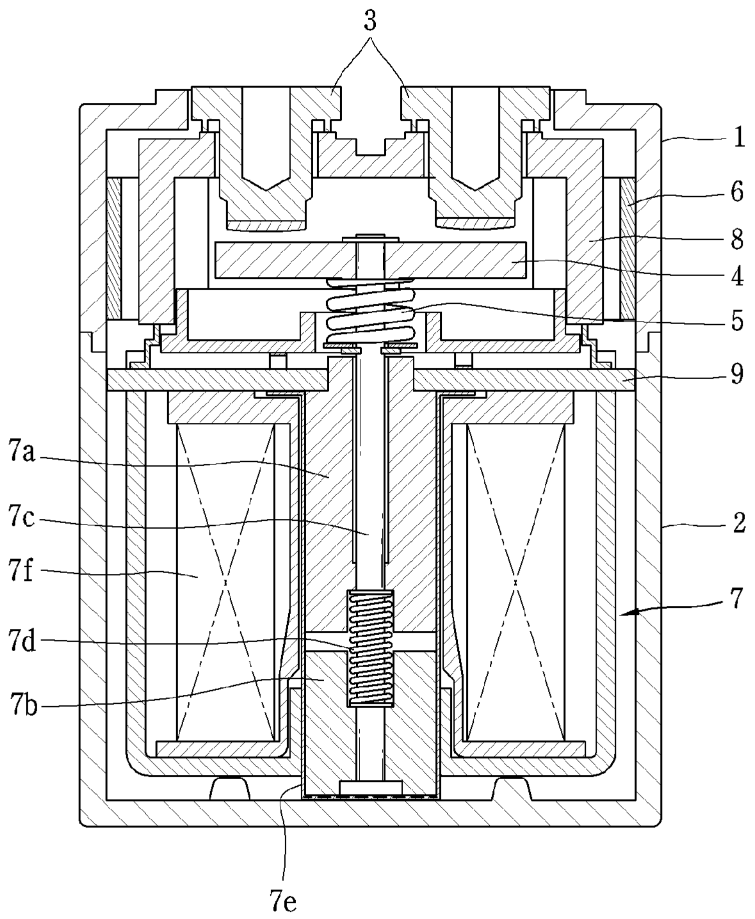
Fig. 1 Prior Art
FIG. 1 is a view of an internal structure of a direct current relay according to the related art.
Figure 2:
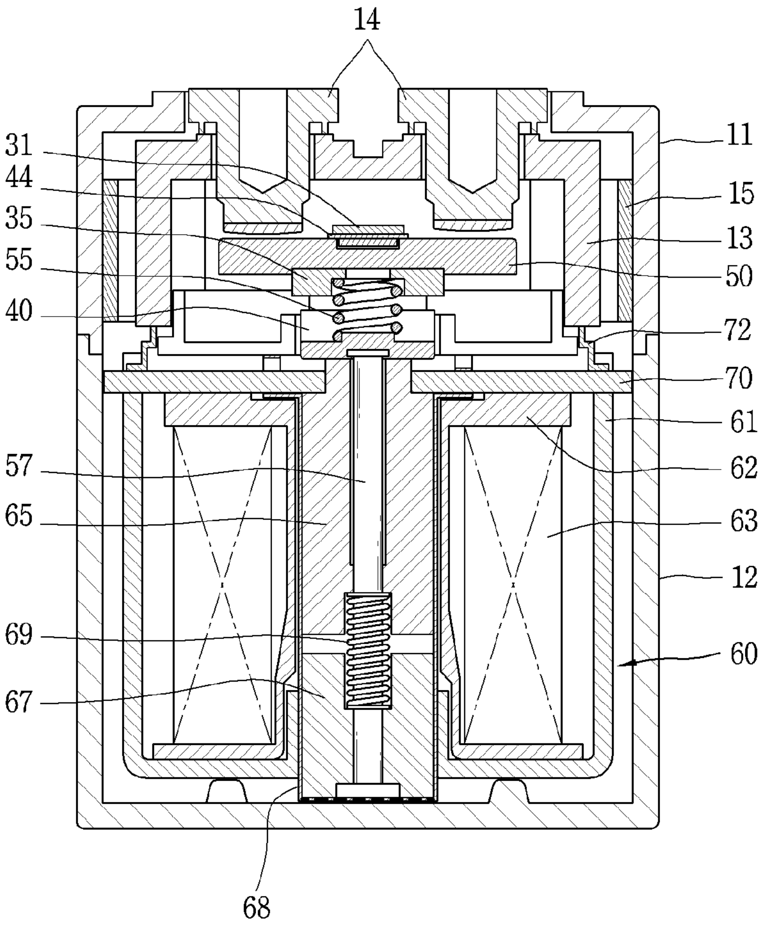
FIG. 2 is a view of an internal structure of a direct current relay according to an embodiment of the present disclosure.
Figure 3:
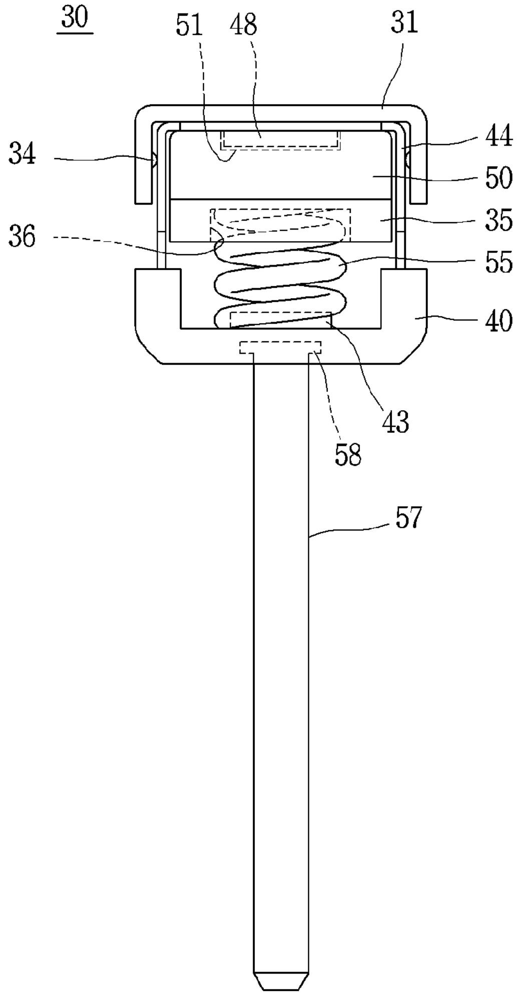
FIG. 3 is a side view of a mover assembly in FIG. 2.
Figure 4:
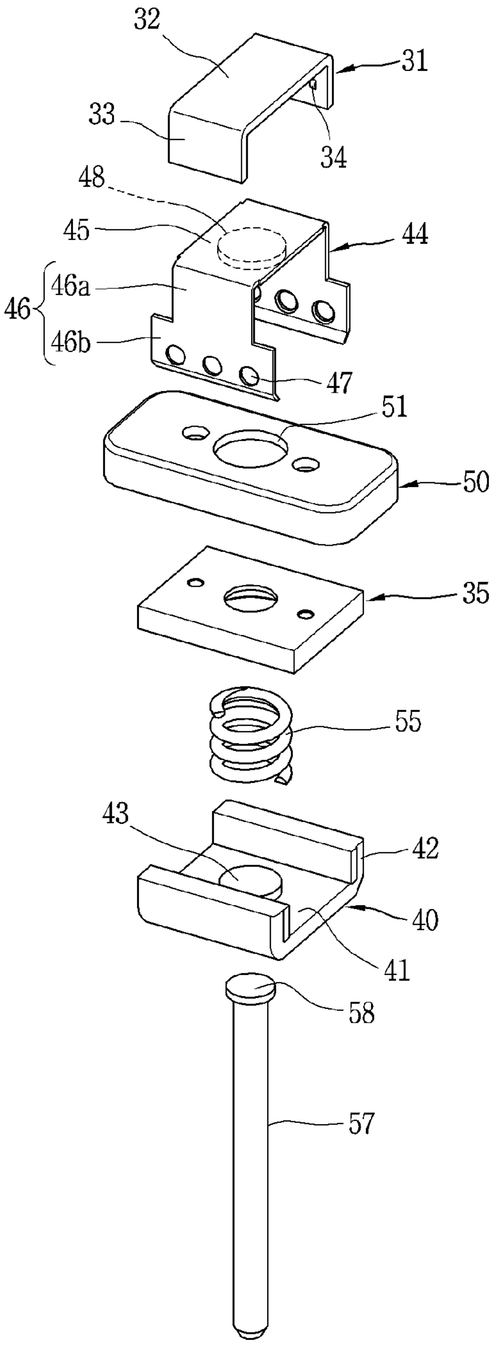
FIG. 4 is an exploded perspective view of the mover assembly of FIG. 3.

FIG. 2 is a view of an internal structure of a direct current relay according to an embodiment of the present disclosure, FIG. 3 is a side view of a mover assembly in FIG. 2, and FIG. 4 is an exploded perspective view of the mover assembly of FIG. 3. Hereinafter, a direct current relay according to each embodiment of the present disclosure will be described in detail with reference to the drawings.

A direct current relay according to an aspect of the present disclosure including a pair of fixed contacts 14 and a movable contact 50 moved vertically by an actuator 60 to be brought into contact with or be separated from the pair of fixed contacts 14, includes a mover support 40 disposed below the movable contact 50 and connected to the actuator 60 by a shaft 57, a mover holder 44 disposed above the movable contact 50 and fixed to the mover support 40, an upper yoke 31 and a lower yoke 35 respectively disposed above and below the movable contact 50 to generate an electromagnetic force, and a contact pressure spring 55 disposed between the lower yoke 35 and the mover support 40, wherein the upper yoke 31 and the lower yoke 35 form a magnetic circuit to offset an electromagnetic repulsive force generated between the fixed contacts 14 and the movable contact 40.

A frame 11, 12 is defined as a box-shaped case to contain, protect, and support components therein. The frame 11, 12 may include an upper frame 11 and a lower frame 12.

An arc chamber 13 is defined in a box shape with an open lower surface, and is installed inside the upper frame 11. The arc chamber 13 is made of a material having excellent insulating property, pressure resistance, and heat resistance so as to extinguish an arc generated at the contact portion 14, 50 upon cutoffs. For example, the arc chamber 13 may be made of a ceramic material. The arc chamber 13 is fixedly installed above a middle plate 70.

The fixed contacts 14 are provided in a pair and fixedly installed on the arc chamber 13. The pair of fixed contacts 14 is exposed at the upper frame 11. One of the fixed contacts 14 may be connected to a power side, and another one of the fixed contacts 14 may be connected to a load side.

The movable contact 50 is defined as a plate-shaped body having a predetermined length, and is installed under the pair of fixed contacts 14. The movable contact 50 is installed in a mover assembly 30 to be moved integrally. Accordingly, the movable contact 50 moves linearly up and down by the actuator 60 installed inside the lower frame 12 to connect or disconnect a circuit by being brought into contact with or separated from the fixed contacts 14.

To effectively control the arc generated when the contact portion 14, 50 is cutoff (or separated), a permanent magnet (not illustrated) is provided. The permanent magnet is installed around the contact portion 14, 50 to generate a magnetic field to control the arc, which is a rapid flow of electricity. And, to fix the permanent magnet, a permanent magnet holder 15 is provided.

The actuator 60 is provided to move the mover assembly 30, that is, the movable contact 50. The actuator 60 may include a yoke 61 defined in a 'U' shape and forming a magnetic circuit, a coil 63 wound around a bobbin 62 installed inside the yoke 61 to generate a magnetic field by receiving an external power source, a fixed core 65 fixedly installed inside the coil 63 to generate a magnetic attraction force by being magnetized due to a magnetic field generated by the coil 63, a movable core 67 installed to be linearly movable under the fixed core 65 so as to be brought into contact with or separated from the fixed core 65 by the magnetic attraction force of the fixed core 65, a shaft 57 in which a lower end thereof is coupled to the movable core 67 and an upper end thereof is slidably inserted through the movable contact 50, a return spring 69 installed between the fixed core 65 and the movable core 67 so as to move the movable core 67 downwardly back to its original position, and a cylinder 68 to accommodate the fixed core 65, the movable core 67, and the return spring 69.

Between the actuator 60 and the arc chamber 13, there is provided the middle plate 70. The middle plate 70 is installed at an upper portion of the yoke 61 and made of a magnetic material to form a magnetic circuit together with the yoke 61. The middle plate 70 also serves as a support plate on which the arc chamber 13 at the upper portion and the actuator 60 at the lower portion may be installed, respectively. The cylinder 68 may be hermetically coupled to a bottom portion of the middle plate 70.

Between the middle plate 70 and the arc chamber 13, there may be provided a sealing member 72. The sealing member 72 is provided along a lower circumference of the arc chamber 13 to seal a space formed by the arc chamber 13, the middle plate 70 (a hole in a central portion of the middle plate), and the cylinder 68.

The mover assembly 30 includes the shaft 57, the mover support 40, the mover holder 44, the movable contact 50, the contact pressure spring 55, the upper yoke 31, and the lower yoke 35.

The shaft 57 is implemented as a straight rod. A lower end of the shaft 57 is fixedly installed in the movable core 67. Accordingly, the shaft 57 moves up and down together with the movable core 67 according to a movement of the movable core 67 to thereby allow the movable contact 50 to be brought into contact with or separated from the fixed contact 14.

At an upper end portion of the shaft 57, a coupling portion 58 is formed. The coupling portion 58 may be defined in a plate shape, for example, a disk shape. The coupling portion 58 of the shaft 57 is fixedly coupled inside the mover support 40. The coupling portion 58 of the shaft 57 may be manufactured in, for example, an insert-molding manner in which the coupling portion 58 is coupled into the mover support 40.

The mover support 40 with the shaft 57 fixedly installed thereon is provided to support the movable contact 50 and the likes. The mover support 40 includes a first flat plate portion 41, and arm portions 42 protruding upwardly from opposite side ends of the first flat plate portion 41.

An upper surface of the first flat plate portion 41 of the mover support 40 is provided with a spring support portion 43 protruding therefrom.

At the arm portion 42 of the mover support 40, the mover holder 44 fixedly installed.

When viewed from front (see FIGS. 2 and 4), a length (in a left-right direction) of the first flat plate portion 41 is shorter than a length (in the left-right direction) of the movable contact 50. Accordingly, contact tips of the movable contact 50 are exposed to opposite sides of the mover support 40, respectively.

A width (in a front-rear direction) of an inner surface (or the upper surface) of the first flat plate portion 41 may be smaller than a width (in the front-rear direction) of the movable contact 50. Accordingly, the mover holder 44 may be stably inserted into the arm portion 42 of the mover support 40 (see FIG. 3).

The mover holder 44 is provided to support the movable contact 50, the upper yoke 31, and the lower yoke 35.

The mover holder 44 is fixedly installed on the mover support 40. The mover holder 44 is defined in a '⊏' shape. That is, the mover holder 44 includes a second flat plate portion 45 and opposite side surface portions 46. The opposite side surface portions 46 are bent downwardly at opposite side ends of the second flat plate portion 45.

A width (or a length in the left-right direction) of the second flat plate portion 45 may be smaller than the length of the movable contact 50. Accordingly, contact tips of the movable contact 50 are exposed to opposite sides of the mover holder 44, respectively.

A lower surface of the second flat plate portion 45 is provided with a support portion 48 protruding therefrom. The support portion 48 may be defined in a cylindrical shape. The support portion 48 is inserted in a support groove 51 of the movable contact 50. A height (or a length) of the support portion 48 and a depth of the support groove 51 are greater than an over travel distance, that is, a distance determined by subtracting a distance between the contact portions 14 and 50 from a distance in which the movable core 67 is moved. Accordingly, even if the movable contact 50 is separated from the mover holder 44, the movable contact 50 does not escape from the mover holder 44.

The side surface portion 46 may include a first side surface portion **46*a* extending downwardly from the second flat plate portion 45, and a second side surface portion 46*b* extending downwardly from the first side surface portion 46*a***.

A width (or a length in the left-right direction) of the first side surface portion **46*a* may be equal to the width of the second flat plate portion 45**.

A width of the second side surface portion **46*b* is greater than the width of the first side surface portion 46*a*. In other words, the widths of the second flat plate portion 45 and the first side surface portion 46*a* are smaller than the width of the second side surface portion 46*b*. In addition, a thickness of the mover holder 44 is smaller than a thickness of the mover support 40. Accordingly, a coupling force in which the mover holder 44 is fixed to the mover support 40** may be maintained while reducing its weight.

The second side surface portion **46*b* is provided with a plurality of holes 47**. Accordingly, a bonding force may increase in an insert-molding structure.

A lower end portion of the second side surface portion **46*b* is bent inwardly. Accordingly, a bonding force may increase when the mover holder 44 is coupled to the mover support 40** in an insert-molding manner.

The movable contact 50 is installed to be brought into contact with a lower surface of the second flat plate portion 45. The movable contact 50 may not be fixed to the mover holder 44 and may be separable from the mover holder 45. Accordingly, when the mover assembly 30 moves upward, the movable contact 50 is separated from the second flat plate portion 45 so as to be brought into close contact with the fixed contact 14 by receiving a contact pressure from the contact pressure spring 55.

An upper surface of the movable contact 50 is provided with the support groove 51. The support portion 48 of the mover holder 44 is inserted in the support groove 51. The depth of the support groove 51 is preferably formed deeper (or longer) than a length of the support portion 48.

The lower yoke 35 is installed under the movable contact 50. The lower yoke 35 may be defined in a plate shape. The contact pressure spring 55 applies a contact pressure to the movable contact 50 through the lower yoke 35. Accordingly, the contact pressure spring 55 may apply a contact pressure without damaging the movable contact 50, thereby improving safety.

The lower yoke 35 is provided with an insertion groove 36 into which the contact pressure spring 55 may be mounted. Since an upper end of the contact pressure spring 55 is fitted into the insertion groove 36 of the lower yoke 35, the contact pressure spring 55 does not escape from the lower yoke 35 and an operation stability is improved.

The upper yoke 31 is installed at an upper portion of the mover holder 44. The lower yoke 31 may include a third flat plate portion 32, and wing portions 33 extending downwardly from opposite side ends of the third flat plate portion 32.

The upper yoke 31 is coupled to the mover holder 44. For example, the upper yoke 31 may be fitted onto the mover holder 44. The upper yoke 31 may be fitted onto the second flat plate portion 45 and the first side surface portion 46*a* of the mover holder 44.

Between the upper yoke 31 and the mover holder 44 may be caulked to reinforce their coupling force. For example, a caulking protrusion 34 may be formed on an inner side surface of the wing portion 33 of the upper yoke 31.

When the circuit is energized, the upper yoke 31 and the lower yoke 35 respectively provided above and below the movable contact 50 are magnetized, and the lower yoke 35 receives a force drawn by the upper yoke 31. Accordingly, the movable contact 50 receives a force upwardly to offset an electromagnetic repulsive force.

The contact pressure spring 55 is provided between the lower yoke 35 and the mover support 40. The contact pressure spring 55 is provided to support the movable contact 50 and provide a contact pressure to the movable contact 50 when energized. The contact pressure spring 55 may be implemented as a compression coil spring.

Since the contact pressure spring 55 is brought into direct contact with the lower yoke 35, it does not damage the movable contact 50. And, this increases durability.

Figure 5:
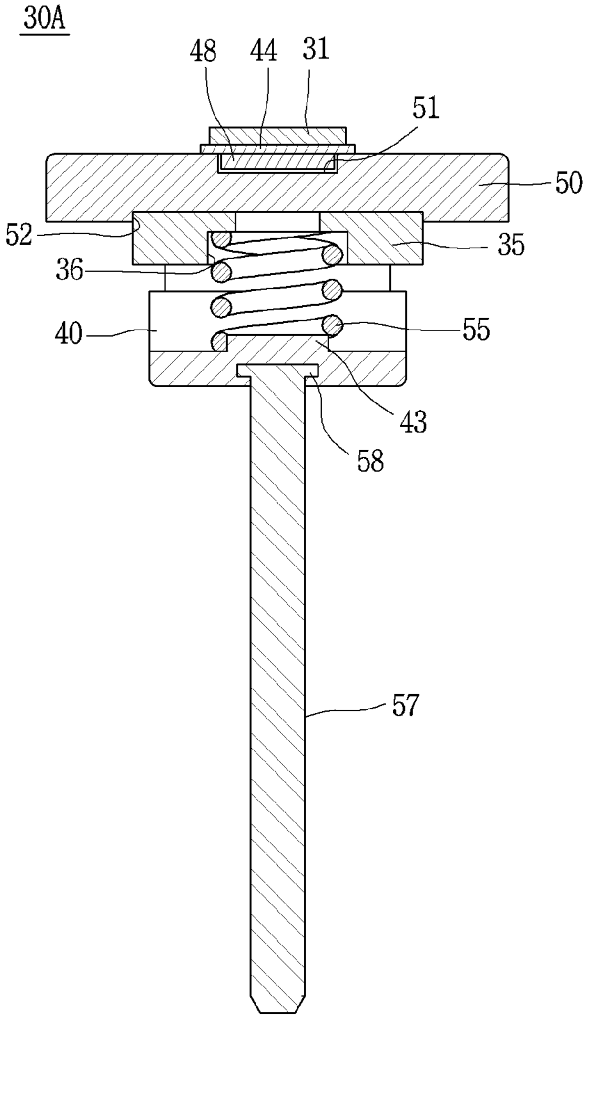
FIG. 5 is a front sectional view of a mover assembly applied to a direct current relay according to another embodiment of the present disclosure.

Hereinafter, a direct current relay according to another embodiment of the present disclosure will be described with reference to FIG. 5.

Components other than a mover holder 44 and a movable contact 50 in a mover assembly 30A of this embodiment may be same as or similar to those in the previous embodiment.

Unlike the previous embodiment, the mover holder 44 is not provided with the support portion 48, and the movable contact 50 is not provided with the support groove 51.

Instead, a lower surface of the movable contact 50 is provided with a yoke insertion groove 52. The lower yoke 35 is fitted into the yoke insertion groove 52. As the movable contact 50 is inserted into the yoke insertion groove 52 and moves together with the lower yoke 35, the movable contact 50 does not escape from the lower yoke 35.

Figure 6:
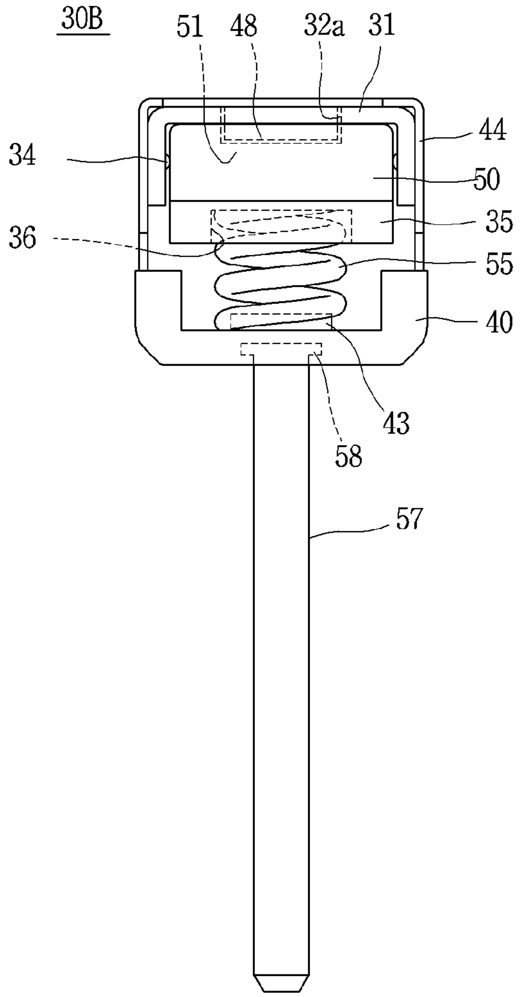
FIG. 6 is a side view of a mover assembly applied to a direct current relay according to still another embodiment of the present disclosure.

Hereinafter, a direct current relay according to still another embodiment of the present disclosure will be described with reference to FIG. 6.

Components other than a mover holder 44 and an upper yoke 31 in a mover assembly 30B of this embodiment may be same as or similar to those in the previous embodiment.

In this embodiment, the upper yoke 31 is disposed below the mover holder 44. In other words, the upper yoke 31 is disposed between the mover holder 44 and the movable contact 50. Respective size of the mover holder 44 and the upper yoke 31 is changed appropriately. A central portion of the upper yoke 31 is provided with a through hole 32*a*, and a support portion 48 of the upper yoke 44 is inserted therethrough. As the upper yoke 31 and the lower yoke 35 surround the movable contact 50 and are disposed more closely, an electromagnetic force may be increased.

A main difference between this embodiment and a first embodiment is an arrangement order. In the first embodiment, the upper yoke 31, the mover holder 44, the movable contact 50, the lower yoke 35, and the mover support 40 are sequentially arranged from top to bottom. However, in this embodiment, the mover holder 44, the upper yoke 31, the movable contact 50, the lower yoke 35, and the mover support 40 are sequentially arranged from top to bottom.

According to the direct current relay according to each of the embodiments of the present disclosure, since the movable contact is provided with the upper yoke and the lower yoke to offset an electromagnetic repulsive force, the contact portion is not unintendedly separated.

The foregoing embodiments are to implement embodiments of the present disclosure. Therefore, those skilled in the art to which the present disclosure pertains various modifications and variations will be possible without departing from the essential characteristics of the present disclosure. Therefore, the embodiments disclosed in the present disclosure are not intended to limit the technical idea of the present disclosure but to describe the present disclosure, and the scope of the technical idea of the present disclosure is not limited by these embodiments. The true scope of the present disclosure should be interpreted by the following claims, and all technical ideas within the equivalent scope should be interpreted as being included in the scope of the present disclosure.

The invention claimed is:

1. A direct current relay comprising a pair of fixed contacts and a movable contact moved vertically by an actuator to be brought into contact with or be separated from the pair of fixed contacts, comprising:

a mover support disposed below the movable contact and connected to the actuator by a shaft;

a mover holder disposed above the movable contact and fixed to the mover support;

an upper yoke and a lower yoke respectively disposed above and below the movable contact to generate an electromagnetic force; and a contact pressure spring disposed between the lower yoke and the mover support, wherein the upper yoke and the lower yoke form a magnetic circuit to offset an electromagnetic repulsive force generated between the fixed contacts and the movable contact, and wherein the upper yoke, the mover holder, the movable contact, the lower yoke, and the mover support are sequentially arranged from top to bottom such that the upper yoke is arranged above the mover holder, which is arranged above the movable contact, which is arranged above the lower yoke, which is arranged above the mover support.

2. The direct current relay of claim 1, wherein an upper end of the shaft is provided with a coupling portion inserted into the mover support.

3. The direct current relay of claim 1, wherein the mover support comprises a first flat plate portion, and arm portions protruding upwardly from opposite side ends of the first flat plate portion to which the mover holder is fixed.

4. The direct current relay of claim 3, wherein an upper portion of the first flat plate portion is provided with a spring support portion protruding therefrom to support a lower end of the contact pressure spring.

5. The direct current relay of claim 1, wherein the mover holder comprises a second flat plate portion, and side surface portions bent downwardly at opposite side ends of the second flat plate portion.

6. The direct current relay of claim 5, wherein a lower surface of the second flat plate portion is provided with a support portion protruding therefrom, and the support portion is inserted in a support groove formed at an upper surface of the movable contact.

7. The direct current relay of claim 6, wherein a length (or a depth) of each of the support portion and the support groove is greater than an over travel length of the movable contact.

8. The direct current relay of claim 5, wherein the side surface portions comprise first side surface portions extending downwardly from opposite ends of the second flat plate portion, and second side surface portions each extending downwardly from the first side surface portion, wherein a width of the second side surface portion is greater than a width of the first side surface portion.

9. The direct current relay of claim 1, wherein a thickness of the mover holder is smaller than a thickness of the mover support.

10. The direct current relay of claim 1, wherein a lower surface of the lower yoke is provided with an insertion groove into which an upper end portion of the contact pressure spring is inserted.

11. The direct current relay of claim 1, wherein the upper yoke comprises a third flat plate portion, and wing portions extending downwardly from opposite ends of the third flat plate portion so as to be fitted into the mover holder.

12. The direct current relay of claim 1, wherein a lower surface of the movable contact is provided with a yoke insertion groove into which the lower yoke is partially inserted.

13. The direct current relay of claim 1, wherein the upper yoke is disposed on an upper portion or a lower portion of the mover holder.

14. A direct current relay, comprising:

a pair of fixed contacts; and a mover assembly moved vertically by an actuator to be brought into contact with or separated from the pair of fixed contacts so as to energize or cut off a circuit, wherein the mover assembly comprises:

- a mover support connected to the actuator by a shaft;
- a mover holder fixed to an upper portion of the mover support;
- a movable contact installed between the mover holder and the mover support; and
- an upper yoke and a lower yoke respectively provided on an upper portion and a lower portion of the movable contact to generate an electromagnetic force, and wherein the mover assembly is sequentially arranged from top to bottom such that the upper yoke is above, the mover holder, which is above the movable contact, which is above the lower yoke, which is above the mover support.

* * * * *